United States Patent
Wagner

(10) Patent No.: US 9,016,710 B2
(45) Date of Patent: Apr. 28, 2015

(54) APPARATUS FOR THE ARTICULATED CONNECTION OF TWO VEHICLE FRAMES OF A CONSTRUCTION MACHINE

(75) Inventor: Jens Wagner, Boppard (DE)

(73) Assignee: BOMAG GmbH, Boppard (DE)

(*) Notice: Subject to any disclaimer, the term of this patent is extended or adjusted under 35 U.S.C. 154(b) by 258 days.

(21) Appl. No.: 13/215,750

(22) Filed: Aug. 23, 2011

(65) Prior Publication Data

US 2012/0045281 A1 Feb. 23, 2012

(30) Foreign Application Priority Data

Aug. 23, 2010 (DE) .......................... 10 2010 035 131

(51) Int. Cl.
| | |
|---|---|
| *B62D 12/00* | (2006.01) |
| *E01C 19/26* | (2006.01) |
| *E01C 19/28* | (2006.01) |
| *E02D 3/026* | (2006.01) |

(52) U.S. Cl.
CPC ................ *B62D 12/00* (2013.01); *E01C 19/26* (2013.01); *E01C 19/282* (2013.01); *E02D 3/026* (2013.01)

(58) Field of Classification Search
CPC ............................... E01C 19/26; B62D 7/1509
USPC .................... 280/468; 404/125, 126
See application file for complete search history.

(56) References Cited

U.S. PATENT DOCUMENTS

| | | | | |
|---|---|---|---|---|
| 2,130,274 | A | * | 9/1938 | Harrison et al. ............... 280/468 |
| 3,966,345 | A | * | 6/1976 | Kofel ............................ 404/126 |
| 4,471,850 | A | | 9/1984 | Rotz |
| 4,662,779 | A | * | 5/1987 | Kaltenegger ................... 404/125 |
| 6,345,932 | B1 | | 2/2002 | Fix |
| 6,486,787 | B2 | * | 11/2002 | Rieger et al. .................. 340/685 |

FOREIGN PATENT DOCUMENTS

| | | |
|---|---|---|
| DE | 2 328 133 A1 | 12/1974 |
| DE | 23 45 412 A1 | 3/1975 |
| DE | 31 36 158 A1 | 6/1982 |
| DE | 82 09 885.9 U1 | 8/1982 |
| DE | 82 09 885.9 U1 | 9/1982 |

(Continued)

OTHER PUBLICATIONS

Espacenet, EPO Machine Translation, Application No. DE 82 09 885.9 U1, published on Aug. 5, 1982, retrieved from http://worldwide.espacenet.com on Mar. 22, 2012 (6 pages).

(Continued)

*Primary Examiner* — Joseph Rocca
*Assistant Examiner* — Felicia L Brittman
(74) *Attorney, Agent, or Firm* — Wood, Herron & Evans, LLP

(57) ABSTRACT

An apparatus is provided for the articulated connection of two vehicle frames, a front and a rear frame, of a construction machine, especially a vibration roller. The apparatus comprises a pivot joint with a vertical pivot axis and a crab-steering joint with a vertical rotational axis, a connection support which connects the pivot joint and the crab-steering joint with one another, and a connecting rod which is linked on one side to the vehicle frame and on the other side to the connection support. The apparatus further comprises a steering drive for relative pivoting of the front and rear frame about the pivot axis, and a crab-steering drive for setting a lateral offset between the front and the rear frame.

9 Claims, 7 Drawing Sheets

(56) References Cited

FOREIGN PATENT DOCUMENTS

| | | | |
|---|---|---|---|
| EP | 0 772 966 | A1 | 5/1997 |
| FR | 2 520 776 | A1 | 8/1983 |
| FR | 2 589 812 | A1 | 5/1987 |
| WO | 2010/091517 | A1 | 8/2010 |

OTHER PUBLICATIONS

Espacenet, EPO Machine Translation, International Publication No. WO 2010/091517 A1, published on Aug. 19, 2010, retrieved from http://worldwide.espacenet.com on Mar. 22, 2012 (13 pages).

German Patent Office, English Abstract of German Patent No. DE 31 36 158 A1, Publication Date Jun. 3, 1982 (1 page).

French Patent Office, English Abstract of French Patent No. FR 2 520 776 A1, Publication Date Aug. 5, 1983 (1 page).

German Patent Office, English Abstract of German Patent No. DE 2 328 133, Publication Date Dec. 19, 1974 (1 page).

German Patent Office, English Abstract of German Patent No. DE 82 09 885.9, Publication Date Sep. 16, 1982 (1 page).

European Patent Office, English Abstract of French Patent No. FR 2 589 812, Publication Date May 15, 1987 (1 page).

European Patent Office, English Abstract of European Patent No. EPO 772 966, Publication Date May 14, 1997 (1 page).

\* cited by examiner

APPARATUS FOR THE ARTICULATED CONNECTION OF TWO VEHICLE FRAMES OF A CONSTRUCTION MACHINE

CROSS-REFERENCE TO RELATED APPLICATIONS

The present application claims priority under 35 U.S.C. §119 of German Patent Application No. 10 2010 035 131.8, filed Aug. 23, 2010, the disclosure of which is hereby incorporated herein by reference in its entirety.

FIELD OF THE INVENTION

The present invention relates to an apparatus for the articulated connection of two vehicle frames, a front and a rear frame, of a construction machine, especially a vibration roller.

BACKGROUND OF THE INVENTION

Two types of steering are generally used in vibration rollers for ground compaction, namely articulated or pivot steering and turntable steering. Due to its simple construction, robust nature and relatively low production costs, articulated or pivot steering is not only used in small and large tandem rollers for road construction and asphalt paving, but also in other types of vibration rollers such as combination rollers and ground compactors. Certain situations during the operation of a vibration roller require a lateral offset of the front drum in relation to the rear drum or the so-called crab-steering mode. This is the case when the rear drum is not to follow in the track of the front drum e.g. so as to avoid cracks at the edge of the track, to enable compaction close to the edge of a curve or simply to extend the working width of the vibration roller. In contrast with vibration rollers that are steered by means of turntable steering and in which crab steering of more than 1 m to the right or left is readily possible as a result of the mutually independent adjusting possibilities of the two turntables or drums, it was necessary to invest considerable constructional effort in vibration rollers with pivot steering in order to enable a crab-steering mode.

An apparatus for coupling two frames of a pivot-steered vibration roller in which crab steering can be set is known e.g. from DE 8209885 U1. In order to enable a lateral offset of the front frame with the front drum mounted thereon in relation to the rear frame with the rear drum mounted thereon, the pivot joint is held displaceably relative to the vehicle frame in guide rails together with the coupling element and the steering drive. A disadvantageous aspect of this configuration is the need for a large amount of space for the connection apparatus both in the longitudinal and lateral directions of the vibration roller. As a result of its complex construction and large number of components, the connection apparatus according to DE 8209885 U1 is also very expensive.

SUMMARY OF THE INVENTION

The present invention is therefore based on the object of providing an apparatus for the articulated connection of two vehicle frames that overcomes the disadvantages of the apparatuses known in the state of the art.

The apparatus in accordance with one embodiment of the present invention for the articulated connection of two vehicle frames, a front and a rear frame, of a construction machine, especially a vibration roller, comprises a pivot joint with a vertical pivot axis and a crab-steering joint with a vertical rotational axis. It further comprises a connection support that connects the pivot joint and the crab-steering joint with one another and a connecting rod, one end of which is linked to one of the vehicle frames and the other end of which is linked to the connection support. It further comprises a steering drive for the relative pivoting of the front and rear frames about the pivot axis, the steering drive being linked at one end to one of the vehicle frames and at the other end to the connection support, and a crab-steering drive for setting a lateral offset between the front and the rear frame, the crab-steering drive being linked at one end to one of the vehicle frames and at the other end to the connection support.

The present invention is based on the realization that the arrangement in accordance with one aspect of the present invention—i.e. with a pivot joint, a crab-steering joint, a connection support, a connecting rod and drives for normal and crab steering—provides a highly compact apparatus for the articulated connection of two vehicle frames. The apparatus in accordance with one embodiment of the present invention requires little space both in the longitudinal and lateral directions of the construction machine so that the total length of the construction machine is not increased unnecessarily. As a result of the compact configuration, more space is provided for the arrangement of other components. Despite the reduced need for space, the connection apparatus in accordance with an exemplary embodiment of the present invention allows an extensive crab steering mode. The connecting rod is used as a rigid captive means for limiting the degrees of freedom of the connection apparatus.

In an advantageous embodiment of the present invention, the pivot joint is arranged on the rear frame and the crab-steering joint on the front frame, the connecting rod and the crab-steering drive being linked to the rear frame and the steering drive to the front frame.

The front frame is defined as the vehicle frame arranged at the front in relation to the preferred or predominant direction of travel of the construction machine. Accordingly, the rear frame is arranged at the rear in relation to the preferred or predominant direction of travel. It is known that many construction machines, especially vibration rollers, reverse during operation, i.e. they change their travelling direction. The designations "front frame" and "rear frame" are not associated with a momentary travelling direction so that, during reversing, i.e. the change from the preferred or predominant travelling direction to the opposite direction, the rear frame is in front of the front frame in the direction of travel. The apparatus in accordance with one aspect of the present invention is essentially arranged in the region between the front and the rear frame. The terms "front frame side" or "rear frame side" shall be understood in such a way that the pivot joint or crab-steering joint is arranged closer to the front or rear frame or closer to the front or rear drum when viewed in the longitudinal or travelling direction of the construction machine. The arrangement of the pivot and crab-steering joints in accordance with the exemplary embodiment of the present invention further increases the compactness in that a part of the connection apparatus is arranged to extend within the vehicle frame or is covered by parts that are rigidly connected with the frame.

Preferably, the total length of the construction machine in a normal position, i.e. in which the longitudinal central axes of the vehicle frames are aligned parallel with respect to one other, has a value that is larger by an increase in length when the crab steering drive is actuated than in a normal position when the crab steering drive is not actuated.

An important advantage of the apparatus in accordance with the principles of the present invention is that the total length of the construction machine will be extended by an increase in length as a result of actuating the crab steering drive. As a result of the arrangement of the joints, the connection support and the connecting rod in accordance with the present invention, the connection apparatus will be extended in the longitudinal direction when crab steering is actuated so that the distance between the front and the rear frame will increase. In the case of conventional connection apparatuses, the distance between the front and the rear frame remains the same when they are in crab-steering mode, as is known e.g. from DE 8209885 U1. In other pivot-steered construction machines in which the connection support is linked directly to the two vehicle frames, the distance between the front and rear frame will even decrease when the crab-steering mode is set. This has the consequence that, in order to avoid a collision of the frame edges during pivoting motion, only a small steering angle is realizable. As a result, maneuverability will decrease when the crab-steering mode is set in such vehicles. In contrast, the distance between the front and rear frame and thus the total length of the construction machine will be increased when the crab steering drive is actuated in accordance with exemplary embodiment of the present invention. This has the consequence that a larger steering angle can be set and more overall space is available during maximum crab steering.

In accordance with one embodiment of the present invention, the maximum increase in length achievable is equal to the length of the connection support. The distance between the pivot- and the crab-steering joint, especially the distance between the pivot axis and the vertical rotational axis of the crab-steering joint, shall be understood in this connection as the "length of the connection support". It is ensured by the partial decoupling of the joints that a rotation of the connection support around the vertical rotational axis of the crab-steering joint can occur upon actuation of the crab-steering joint. The rigid connecting rod ensures a defined movement of the rear frame in relation to the front frame and an increase of the overall length is achieved, the limit value of which is equal to the length of the connection support. Accordingly, the maximum adjustable offset of the front frame in relation to the rear frame is equal to the length of the connection support.

Preferably, the crab-steering drive is provided with a rigid arrangement when it is not actuated, wherein its longitudinal axis is perpendicular to the longitudinal axis of the connecting rod in the normal position. As a result, when the crab-steering drive is not actuated, the crab-steering drive and the connecting rod form two rigid captive means arranged perpendicularly with respect to one another. Both the crab-steering drive and the connecting rod are respectively linked with one end to the connection support, especially to respective receiving parts, and with the other end to the rear frame. This has the consequence that, upon actuating the steering drive, which for its part is linked at the one end to a steering drive receiver on the connection support and at the other end to the front frame, a rotation of the rear frame around the pivot axis can occur.

In an exemplary embodiment of the present invention, the connection support comprises a common receiving element for the steering drive, the crab-steering drive and the connecting rod, the receiving element being arranged in a rotatable manner on a steering pivot forming the pivot axis. Instead of providing separate receiving parts, a common receiving element can be provided which is arranged on a pin that is carried by the connection support and defines the pivot axis. This saves production costs and further reduces the need for space. The receiving element determines in a simple manner the required geometric and physical quantities, e.g. the lever arms. Preferably, the longitudinal axis of the connecting rod is aligned essentially parallel to the longitudinal axis of the connection support.

Preferably, the apparatus in accordance with the invention additionally comprises a pendulum bearing. A receiving part for a pendulum bearing can simply be arranged on the pin of the connection support. The pendulum bearing allows an oscillating movement of the rear frame in relation to the front frame, i.e. a rotational movement about a horizontal axis, e.g. about one of the longitudinal central axes of the vehicle frames. A complete system is thus provided in a compact way, with which two vehicle frames can be connected with one another optimally for use on construction sites.

In a further advantageous embodiment of the present invention, the pivot joint is arranged centrally in the normal position in the direction of the longitudinal axis of the construction machine. In other words, the pivot joint forms the centre of the total length of the construction machine. This leads to the consequence that, in the case of a tandem roller, the rear drum will follow the track of the front drum precisely even in the case of steering motions if the drums are spaced equally far apart from the pivot joint. This is advantageous as a frictional loss of the rear drum can be reduced.

The present invention also relates to a pivot-steered vibration roller, especially a tandem roller, comprising an apparatus in accordance with the present invention for an articulated connection.

BRIEF DESCRIPTION OF THE DRAWINGS

The present invention is explained in greater detail below under reference to the schematic drawings, wherein:

FIG. 8 shows a perspective view of the connection apparatus of FIG. 5, without the upper frame linkage 20a;

DETAILED DESCRIPTION OF THE INVENTION

Figure 4:
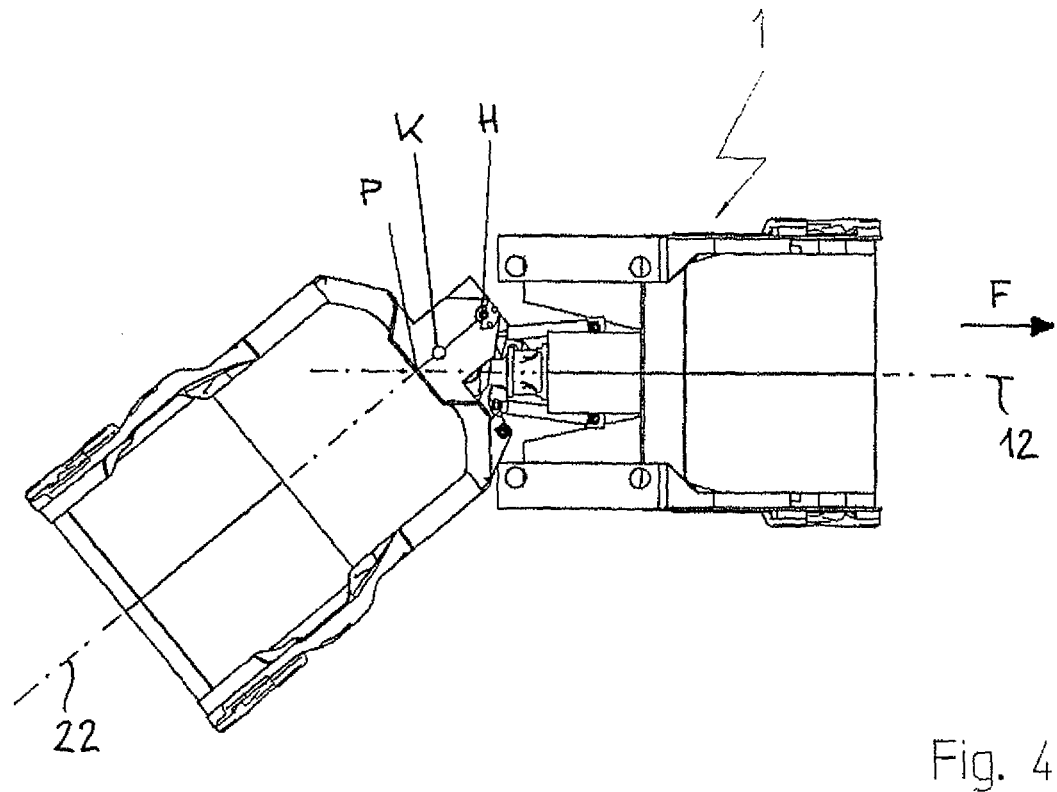
FIG. 4 shows a top view of the construction machine of FIG. 1 with crab steering during the steering process.
Figure 5:
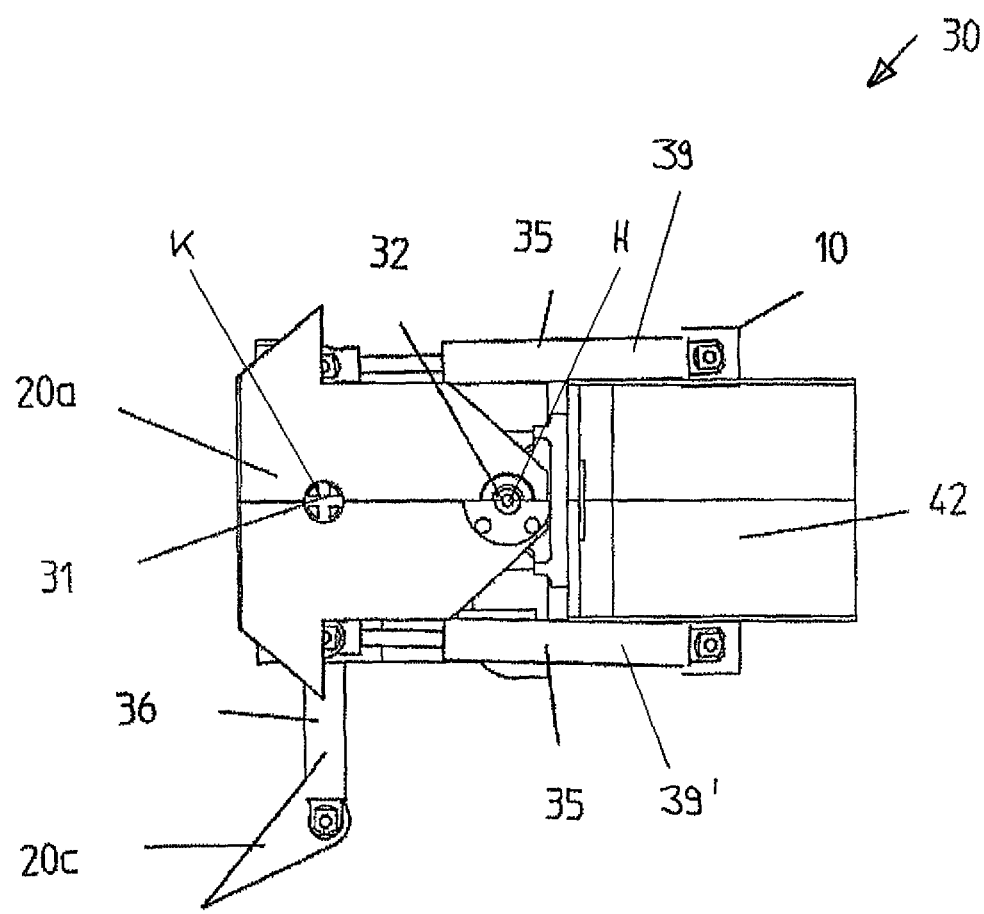
FIG. 5 shows an enlarged top view of the connection apparatus of FIG. 1.
Figure 6:
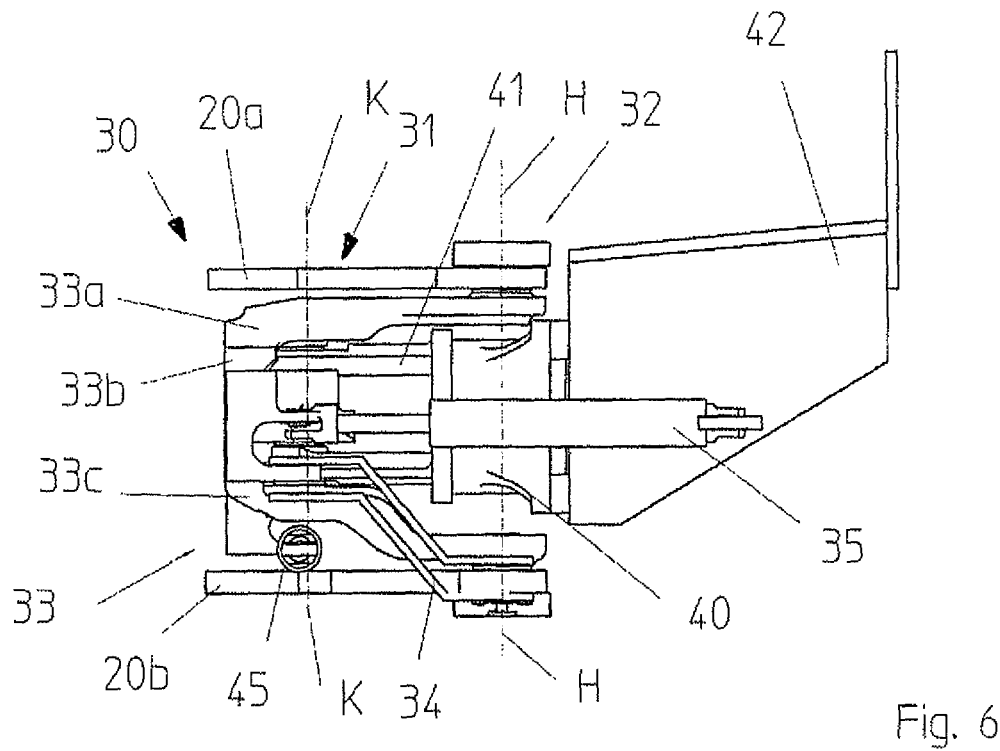
FIG. 6 shows a side view of the connection apparatus of FIG. 5.
Figure 7:
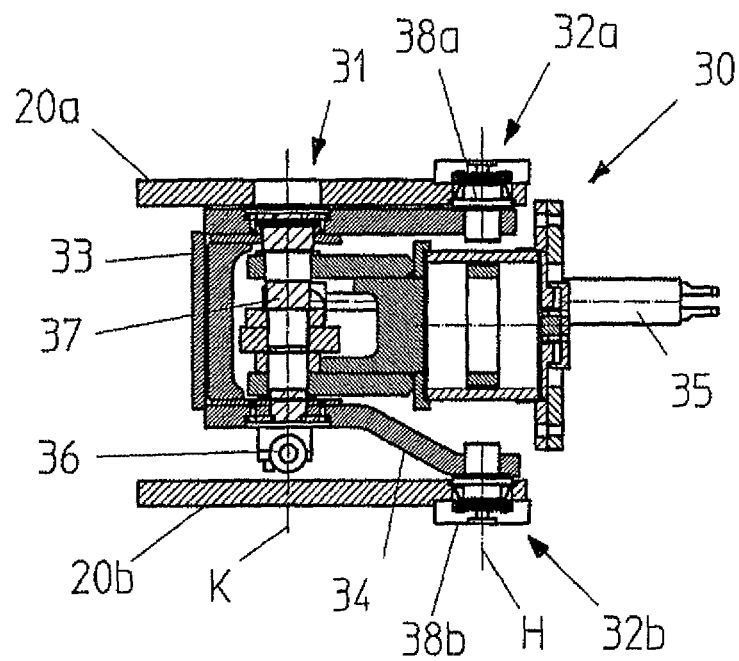
FIG. 7 shows a sectional view of the connection apparatus of FIG. 6.
Figure 8:
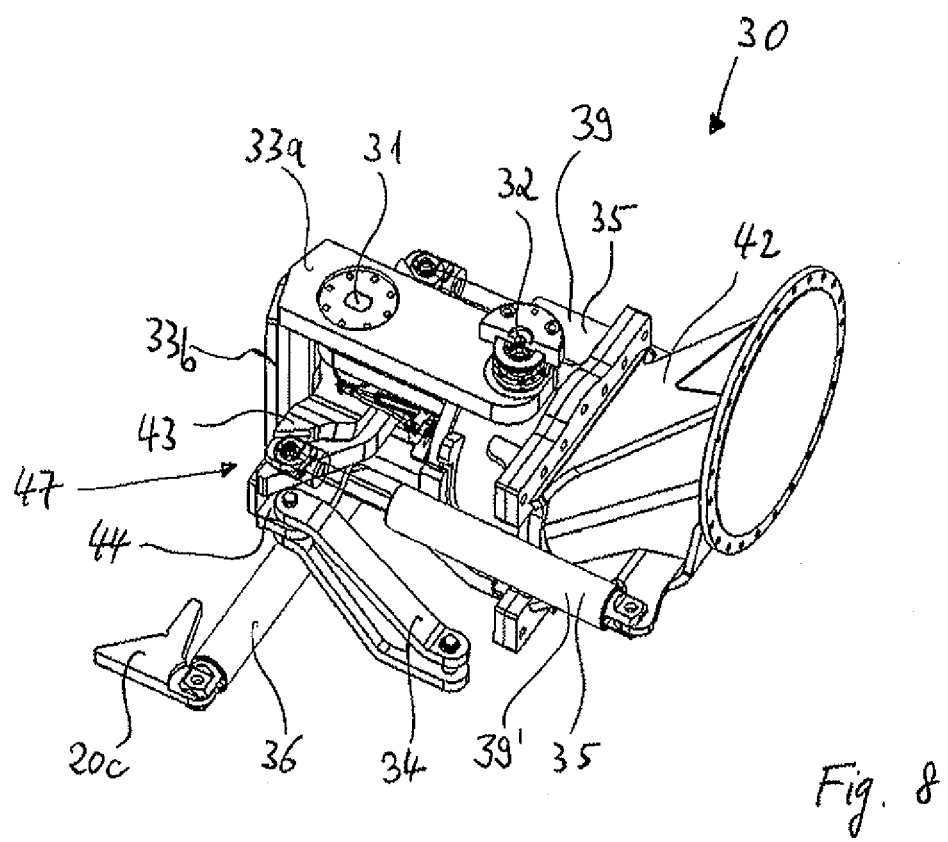

FIGS. 1 to 4 show a construction machine 1, which is a tandem roller for ground compaction. A number of parts are not shown in the drawings for better illustration of the apparatus 30 in accordance with the present invention for the articulated connection of two vehicle frames 10, 20, a front frame 10 and a rear frame 20. A front drum 11 is held in the front frame 10 and a rear drum 21 in the rear frame 20. The construction machine 1 preferably or predominantly moves in the travelling direction F, but a change of direction in the opposite direction is easily possible. During steering (FIG. 2), a steering angle "a" is set between the longitudinal central axis 12 of the front frame 10 and the longitudinal central axis 22 of the rear frame 20. During crab steering (FIG. 3), the longitudinal central axes 12, 22 are parallel relative to one another and a lateral offset "s" is set between the longitudinal central axis 12 of the front frame 10 and the longitudinal central axis 22 of the rear frame 20. As shown in FIG. 4, a simultaneous execution of the normal steering process and crab steering is easily possible.

A vertical pivot axis "K" and a vertical rotational axis "H" for crab steering lie spaced apart from one another on the longitudinal central axis 22 of the rear frame 20, while the rotational axis "H" for crab steering ends up lying closer than the pivot axis "K" to the front vehicle frame 10. The distance between the two is designated with "l".

Figure 1:
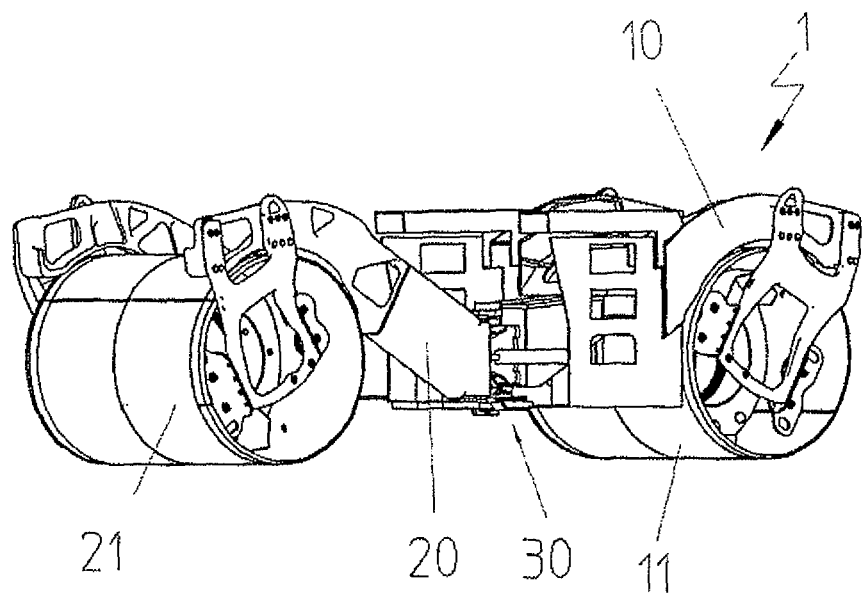
FIG. 1 shows a perspective view of a construction machine with an embodiment of the connection apparatus in accordance with the principles of the present invention in a normal position.
Figure 2:
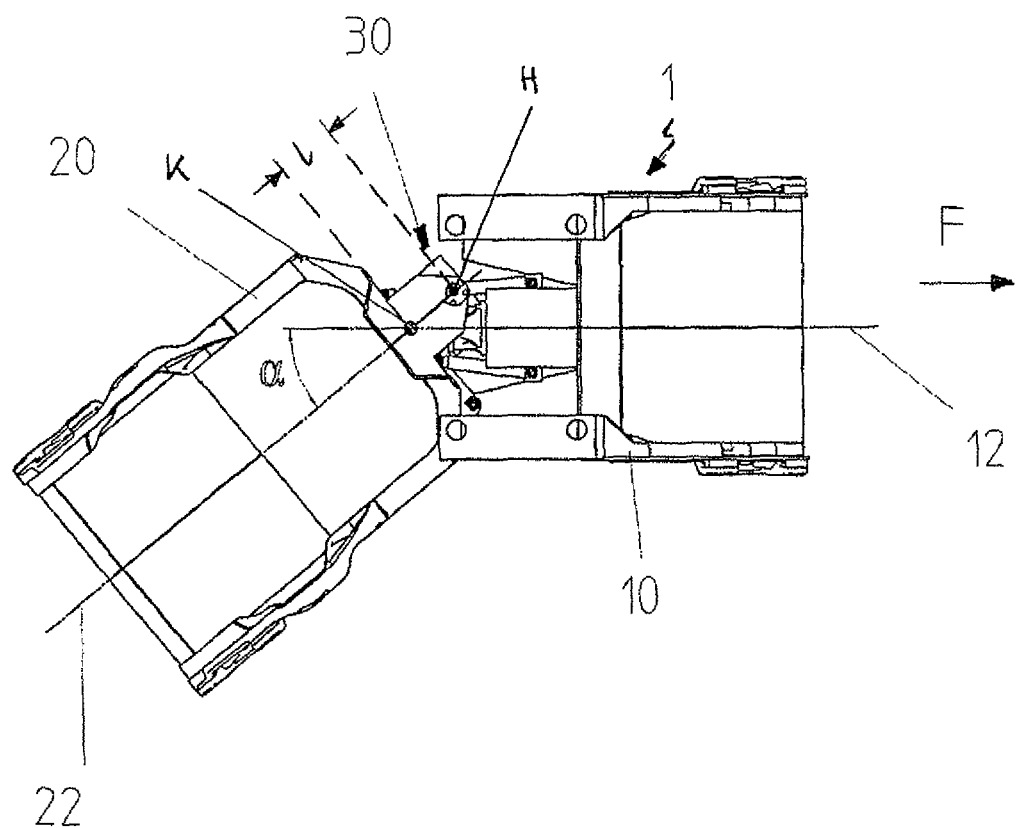
FIG. 2 shows a top view of the construction machine of FIG. 1 during the steering process.
Figure 3:
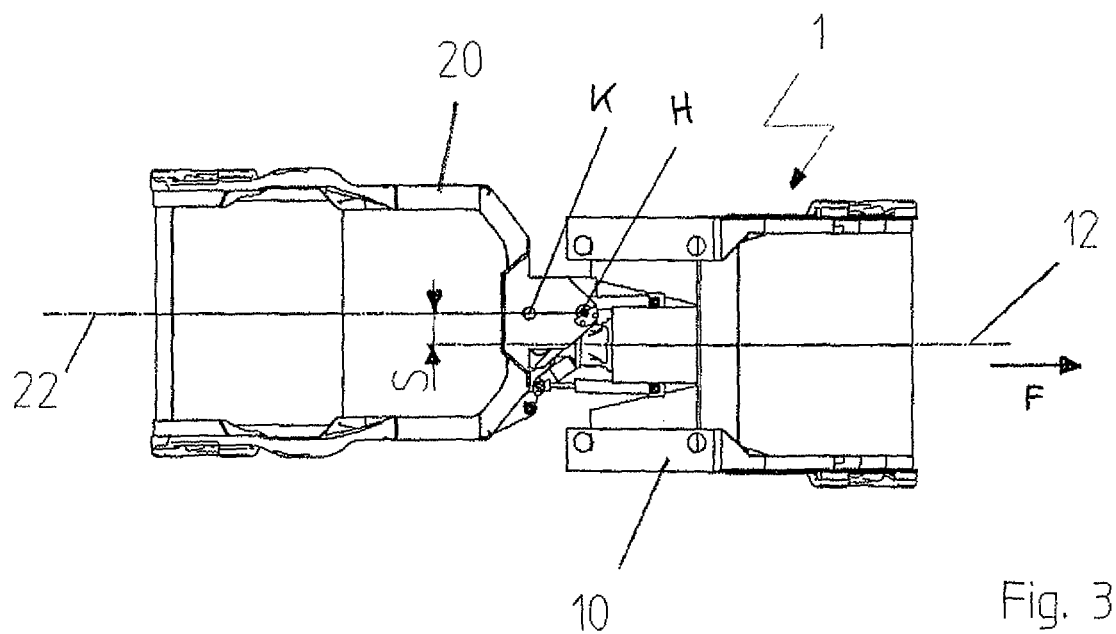
FIG. 3 shows a top view of the construction machine of FIG. 1 with crab steering.

According to FIG. 2, when the vehicle is tracing a curved path, the longitudinal central axes 12 and 22 of the front and rear frames 10, 20 intersect in the pivot axis "K" when the vehicle is not in crab-steering mode. If a normal steering process and crab steering are executed simultaneously, the point of intersection "P" of the two longitudinal central axes 12, 22 lies next to the pivot axis "K" on the longitudinal central axis 22 of the rear frame 20, to be precise on the opposite side of the pivot axis "K" in relation to the rotational axis "H". When the vehicle traces a straight path (not shown), the pivot axis "K" and the rotational axis "H" lie both on the longitudinal central axis 22 of the rear frame 20 as well as on the longitudinal central axis 12 of the front frame 10.

FIGS. 5 to 8 show different views of an embodiment of the apparatus 30 in accordance with the principles of the present invention for the articulated connection of both vehicle frames 10, 20. Parts are not shown here either in part or in full for the sake of the clarity of the illustration. The apparatus 30 in accordance with one embodiment of the present invention thus comprises a pivot joint 31 with the pivot axis "K" and a crab steering joint 32 with the vertical rotational axis "H". A connection support 33, which comprises an upper support plate 33a, a lateral support plate 33b and a bottom support plate 33c, connects the pivot joint 31 and the crab-steering joint 32 with one another. The connection support 33, which is mounted as a pivoting arm on the front vehicle frame 10 on the one side and on the rear vehicle frame 20 on the other side, is a part of the crab-steering joint 32 and carries the pivot joint 31.

The front frame 10 and the rear frame 20 are thus connected with each other via the connection support 33 in such a way that independent rotations about the pivot axis "K" and the rotational axis "H" are possible. A rotation about the pivot axis "K" produces an angular offset about the steering angle "a" between the front and rear vehicle frames 10, 20. A rotation about the rotational axis "H" produces the crab-steering mode, i.e. a parallel displacement of the front and rear vehicle frames 10, 20. If the steering drive 35 is actuated and the crab-steering drive 36 is blocked, only a turning or curving motion will result. If the crab-steering drive 36 is actuated and the steering drive is blocked, there occurs only a setting or adjustment of the crab steering with no modification of the direction of travel. If both are actuated simultaneously, the two modes are simultaneous.

Various receiving parts 41, 43, 44, 45 are arranged on the steering pivot 37, which are the receiver 43 for the steering drive 35, the receiver 41 for the pendulum bearing 40, the receiver 44 for the connecting rod 34, and the receiver 45 for the crab-steering drive 36. The receiving elements 43, 44 and 45 can be arranged as a common receiving element 47. The pendulum bearing 40 allows an angular offset between the front and rear vehicle frames 10, 20 and a horizontal axis.

Both the steering drive 35 and the crab-steering drive 36 are arranged in the illustrated example as hydraulic actuating cylinders 39, 39'. The steering drive 35 is linked on the piston or housing side to the front frame 10 and on the side of the piston rod to the receiver 43. Receiver 43 forms a two-armed lever arm for the pivot movement about the pivot axis "K", wherein the hydraulic actuating cylinders 39 and 39' respectfully engage at each arm. For a steering motion, both hydraulic actuating cylinders 39, 39', which are arranged opposite one another in relation to the pivot axis "K", are steered in opposite directions. One end of the connecting rod 34 is linked to the receiver 44, while the other end is linked to a frame plate 20c, the frame plate 20c being rigidly connected to the rear frame 20. The connecting rod 34 ensures parallel guidance of the receiver 43 of the steering drive 35 with respect to the rear frame 20.

The receiver 45 defines a lever arm for the crab-steering drive 36 in relation to the rotational axis "H". In the example shown, the length of this lever arm corresponds to the distance "l" between the pivot axis "K" and the rotational axis "H", as the crab-steering drive 36 engages in the area of the pivot joint 31 on the connection support. The lever arm is formed by the upper support plate 33a.

The crab-steering joint 32 is arranged in two parts and comprises an upper and a bottom crab-steering joint part 32a, 32b. The upper joint part 32a is formed by the upper frame connection 20a, the upper pin 38a and the upper support plate 33a. The bottom joint part 32b is formed by the bottom frame connection 20b, the bottom pin 38b and the bottom support plate 33b. The pendulum bearing 40 is connected via the adapter 42 with the front frame 10.

Figure 9A:
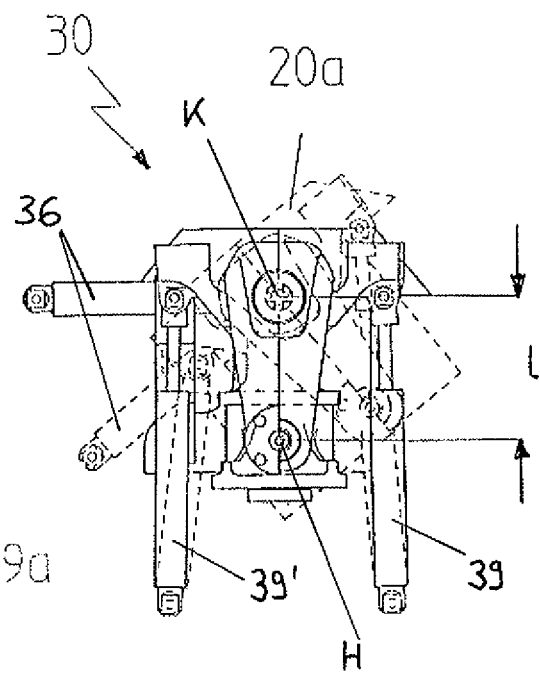
FIG. 9a shows a top view of the connection apparatus during the steering process.

FIG. 9a shows a top view of the apparatus 30 in accordance with one embodiment of the invention during the steering process. The unbroken lines show the state prior to initiating the steering process and the broken lines show the state during the steering process. A rotation of the rear frame 20 about the pivot axis "K" occurs by actuating the steering drive 35. The crab-steering drive 36 shall be regarded during the mere steering motion as a rigid connection between the rear frame 20 and the connection support 33 or the receiver 45 of the crab-steering drive 36.

Figure 9B:
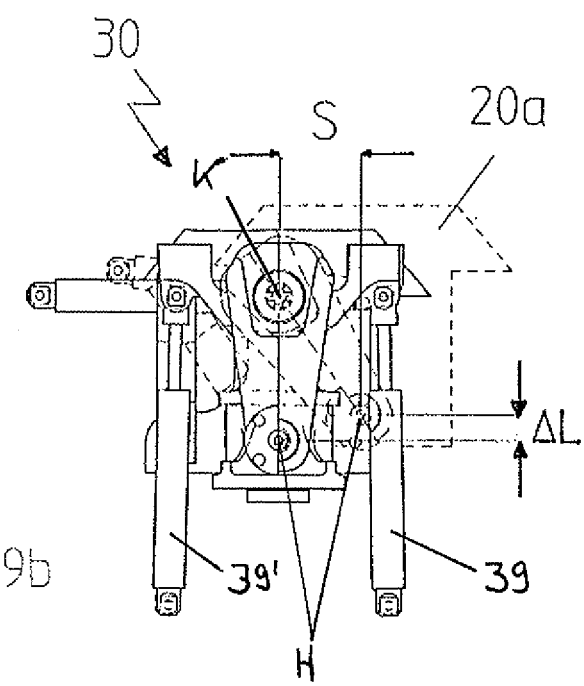
FIG. 9b shows a top view of the connection apparatus with crab steering.
Figure 10:
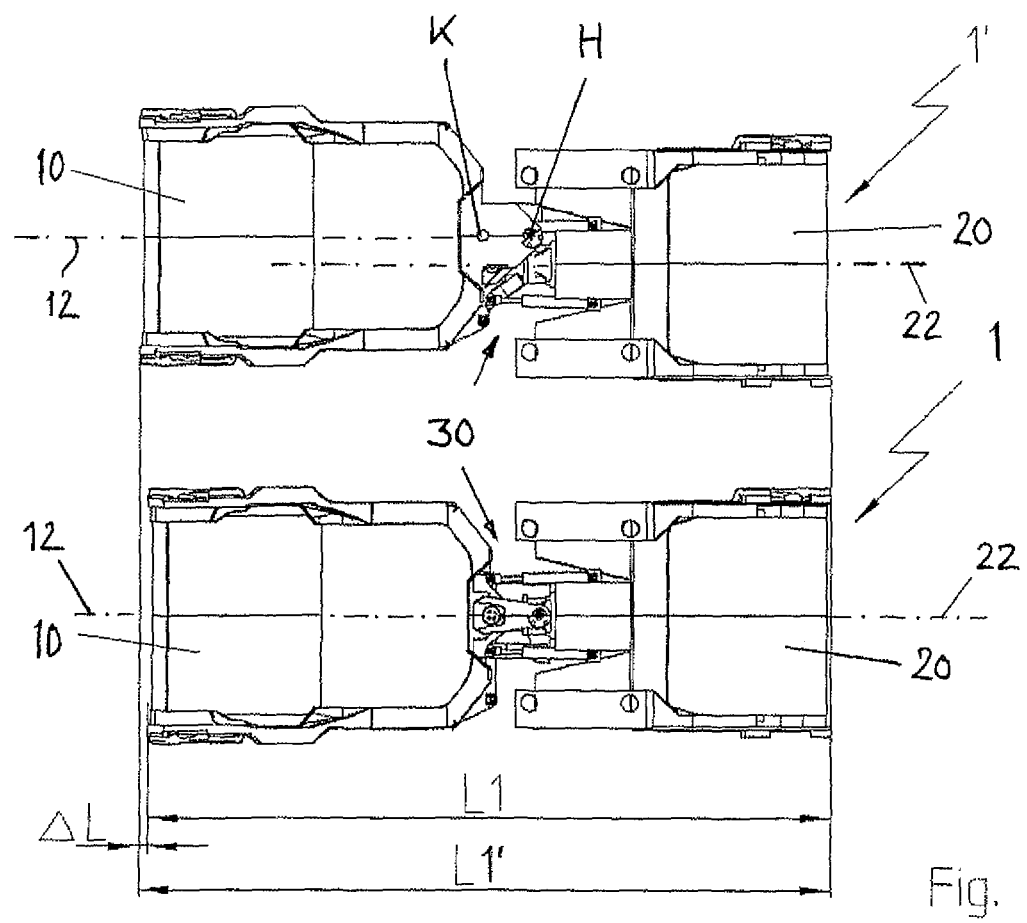
FIG. 10 shows the top view of two construction machines with and without crab steering in the normal position.

FIG. 9b shows a top view of the apparatus 30 in accordance with one embodiment of the present invention during crab steering. The unbroken lines show the state before the initiation of crab steering and the broken lines show the state with the lateral offset "s". A lateral offset "s" and simultaneous increase in length "ΔL" is achieved by actuating the crab steering drive 36. In the case of a respective configuration, a maximum offset "s" at a level of length "l" and a maximum increase in length "ΔL" also at a level of length "l" of the connection supports 33 are possible. The length "l" of the connection supports 33 shall be understood in this case as the distance of the pivot axis "K" from the rotational axis "H" of the crab-steering joint 32. FIG. 10 shows the increase in length ΔL=L1'−L1 of the construction machine 1 in an overview. A further advantage of the invention is that the steering drive 35, as shown in FIG. 9b, is decoupled from the crab-steering motion of the rear frame 20 in relation to the front frame 10, i.e. it need not perform the motion. The actuating cylinders of the steering drive 35 are thus protected.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. An apparatus for the articulated connection of a front vehicle frame and a rear frame of a construction machine, comprising:
   a pivot joint having a vertical pivot axis (K) on one of the front and rear vehicle frames;
   a crab-steering joint located at a distance from the pivot joint having a vertical rotational axis (H) on another of the front and rear vehicle frames;
   a connection support connecting the pivot joint and the crab-steering joint with one another, wherein the connection support is mounted as a pivoting arm on the front vehicle frame on one end and on the rear vehicle frame on the other end, and wherein the connection support is part of the crab-steering joint and carries the pivot joint;
   a steering drive for relative pivoting of the front frame and the rear frame about the pivot axis (K), with the steering drive being linked on one end to the vehicle frame which is connected to the pivot joint and on the other end to the connection support;
   a crab-steering drive for setting a lateral offset (s) between the front frame and the rear frame, the crab-steering drive being linked on one end to the vehicle frame that is near the pivot joint and on the other end to the connection support;
   wherein the rotational axis (H) of the crab-steering joint is connected more closely to the vehicle frame which is linked to the crab-steering joint then to the pivot axis (K) such that a distance between the front and rear vehicle frames increases when the crab-steering drive is actuated; and
   wherein a maximum increase in length of the construction machine (ΔL) achievable by actuating the crab-steering drive is equal the length (l) of the connection support.

2. An apparatus according to claim 1, further comprising a connecting rod, wherein the pivot joint is arranged on of the rear frame and the crab steering joint is arranged on of the front frame, the connecting rod is linked to the connection support and the rear frame, the crab-steering drive is linked to the rear frame and the steering drive is linked to the front frame.

3. An apparatus according to claim 1, wherein the crab-steering drive is rigidly arranged upon non-actuation, wherein its longitudinal axis is perpendicular to the longitudinal axis of the connecting rod, which is linked to the connection support, in a normal position in which the longitudinal central axes of the front and rear vehicle frames are aligned parallel with respect to one another when the crab-steering drive is not actuated.

4. An apparatus according to claim 1, wherein the connection support comprises a common receiving element for the steering drive, the crab-steering drive and a connecting rod being linked to the connection support, the common receiving element being rotatably arranged on a steering pin forming the pivot axis (K).

5. An apparatus according to claim 1, wherein the apparatus additionally comprises a pendulum bearing.

6. An apparatus according to claim 1, wherein, in a normal position, in which the longitudinal central axes of the front and rear vehicle frames are aligned parallel with respect to on another when the crab-steering drive is not actuated, the pivot joint is arranged centrally in the direction of the longitudinal axis of the construction machine.

7. A pivot-steered vibration roller comprising an apparatus for an articulated connection according to claim 1.

8. A pivot-steered vibration roller according to claim 7, wherein the vibration roller comprises a tandem roller.

9. An apparatus according to claim 1, wherein the construction machine comprises a vibration roller.

* * * * *